United States Patent [19]

Reinecke

[11] Patent Number: 4,818,036

[45] Date of Patent: Apr. 4, 1989

[54] BRAKING POWER TRANSMITTER

[75] Inventor: Erich Reinecke, Burgdorf, Fed. Rep. of Germany

[73] Assignee: WABCO Westinghouse Fahrzeugbremsen GmbH, Hanover, Fed. Rep. of Germany

[21] Appl. No.: 33,442

[22] Filed: Apr. 1, 1987

[30] Foreign Application Priority Data

Apr. 9, 1986 [DE] Fed. Rep. of Germany ....... 3611941

[51] Int. Cl.⁴ .................... B60T 13/66; G01D 5/20
[52] U.S. Cl. ........................................ 303/50; 74/512;
74/514; 188/3 R; 188/158; 188/156; 267/166;
303/3; 303/15; 303/20; 303/101; 303/DIG. 3;
338/108; 338/153
[58] Field of Search ......................... 303/2-3,
303/13-15, DIGS. 1-4, 20, 101, 104, 15, 20,
50-56; 188/158, 3 R, 155-165, 71.6; 73/161,
132; 60/545; 74/512, 514; 338/153, 47, 108, 39;
267/166

[56] References Cited

U.S. PATENT DOCUMENTS

| 1,917,488 | 7/1933 | Bethenod | 188/156 X |
| 1,952,679 | 3/1934 | Leveen | 338/153 X |
| 1,960,915 | 5/1934 | Morse | 188/156 X |
| 2,052,201 | 8/1936 | Logan, Jr. et al. | 188/156 |
| 2,069,578 | 2/1937 | Eaton | 188/158 X |
| 2,091,086 | 8/1937 | Taylor | 338/153 X |
| 2,715,049 | 8/1955 | Hines | 303/14 X |
| 3,003,825 | 10/1961 | Kemble | 267/152 X |
| 3,802,745 | 4/1974 | Strifler et al. | 303/DIG. 4 |
| 3,827,758 | 8/1974 | Hansen | 303/13 X |
| 3,888,550 | 6/1975 | Reihecke et al. | 303/20 X |
| 4,002,373 | 1/1977 | Mori | 303/3 |
| 4,095,680 | 6/1978 | Vogelsang | 303/3 X |
| 4,120,489 | 10/1978 | Borlinghaus | 267/166 X |
| 4,161,341 | 7/1979 | Reinecke et al. | 188/158 X |
| 4,279,162 | 7/1981 | Neill et al. | 338/39 X |
| 4,295,687 | 10/1981 | Becker et al. | 188/3 R X |
| 4,327,414 | 4/1982 | Klein | 303/DIG. 4 |
| 4,436,347 | 3/1984 | Stumpe | 303/15 X |
| 4,533,185 | 8/1985 | Krause | 303/20 X |
| 4,602,702 | 7/1986 | Ohta et al. | 188/158 X |
| 4,671,576 | 6/1987 | Fourie | 303/20 X |
| 4,695,819 | 9/1987 | Bowsher | 74/512 |

FOREIGN PATENT DOCUMENTS

| 0190411 | 8/1986 | European Pat. Off. . |
| 1929781 | 3/1970 | Fed. Rep. of Germany . |
| 1961039 | 6/1971 | Fed. Rep. of Germany . |
| 1961139 | 12/1977 | Fed. Rep. of Germany ..... 188/71.6 |
| 2724179 | 11/1978 | Fed. Rep. of Germany ........ 303/20 |
| 2839291 | 3/1980 | Fed. Rep. of Germany . |
| 2937657 | 4/1981 | Fed. Rep. of Germany ........ 303/52 |
| 3413759 | 10/1985 | Fed. Rep. of Germany . |
| 3434512 | 3/1986 | Fed. Rep. of Germany . |
| 3504096 | 8/1986 | Fed. Rep. of Germany ........ 303/20 |
| 2544268 | 10/1984 | France . |
| 0118557 | 7/1984 | Japan ........................... 303/DIG. 3 |
| 2127505 | 4/1984 | United Kingdom . |

OTHER PUBLICATIONS

DE-Buch: Dr. Ing. Paul M. Pflier, Springer-Verlag, Elektrische Messung Mechanischer Grössen, 3. Aufl., Berlin/Göttingen/Heidelberg 1948, S. 68–70.

Primary Examiner—Douglas C. Butler
Attorney, Agent, or Firm—J. O. Ray, Jr.

[57] ABSTRACT

The present invention is a braking value transmitter with a pedal to modulate the braking pressure. The pedal is braced against a spring. The force exerted by the pedal or the position of the pedal is sensed by an electronic sensor. The output signal of the sensor is fed to an electronic system, which transforms the approximately linear characteristic of the sensor into a progressive characteristic.

10 Claims, 2 Drawing Sheets

BRAKING POWER TRANSMITTER

FIELD OF THE INVENTION

The present invention relates, in general, to a braking power transmission and, more particularly, the invention relates to a braking power transmitter which can be used in a commercial vehicle equipped with a pneumatic braking system to produce a control pressure for the brake cylinder.

BACKGROUND OF THE INVENTION

In brake systems equipped with electrical braking control, the braking power transmitters produce a corresponding electrical output signal, which is then used for control of the brake cylinder pressure. In this case, the brake cylinder of the vehicle is fed compressed air by means of solenoid valves (modulators) which can be controlled by either an analog or a digital means.

In a pneumatic braking power transmitter (pedal valve) of modern construction, the force applied by the driver's foot is transmitted via a pedal to a rubber spring with a non-linear force-distance characteristic. A pneumatic control pressure can thereby be achieved, which increases progressively with the distance or the angle of tilt of the pedal. The purpose of this measure is to make a precision braking operation possible in the initial range of pedal movement (partial braking) with a low control pressure. In the final range of pedal movement (full braking), on the other hand, the braking pressure increases to a greater extent. The braking pressure curve achieved in this manner also corresponds to the force applied by the driver's foot.

A brake pedal valve of the type described above is generally known in the art. One such brake pedal valve is described in German Pat. No. 29 37 657. On this particular known valve, there is also a potentiometer, which is used to control a retarder and to emit specified electrical switching signals.

A disadvantage with the use of a rubber spring is that its action is a function of the temperature, and it is also subject to the effects of aging.

These disadvantages are not experienced when steel springs or metal springs are used. In the case of steel or metal springs, however, the desired progressivity of the brake pressure modulation can only be achieved in a complex manner, for example, by parallel connection of several different springs, or by a spring with an increasing wire thickness.

German Pat. No. 19 61 039 describes a braking power transmitter, in which the force exerted on a brake pedal by the driver's foot is transmitted by means of a steel spring to a power measurement apparatus. The power exerted is converted into an electrical value in the power measurement apparatus, this value is used by an electronic control apparatus as a setpoint value. The actual value of braking pressure acting on the brake cylinder of the vehicle is set proportional to the setpoint value. The braking force therefore increases in a proportional, or linear manner, as a function of the force applied by the driver's foot.

OBJECTS OF THE INVENTION

It is, therefore, an object of the present invention to provide a braking power transmitter, which emits a control signal that increases progressively with the pedal distance, but which nevertheless operates with a relatively simple steel spring.

Another object of the invention is to provide a brake power transmitter in which a complete de-coupling of the curves of foot force and braking force can be achieved, when using an appropriate configuration of the electronic system, therefore, any desired curve of braking force can be achieved.

The above and various other objects and advantages of the present invention will become more readily apparent to these persons skilled in the braking art from the following more detailed description when such description is taken in conjunction with the attached drawings.

BRIEF DESCRIPTION OF THE INVENTION

Figure 1:
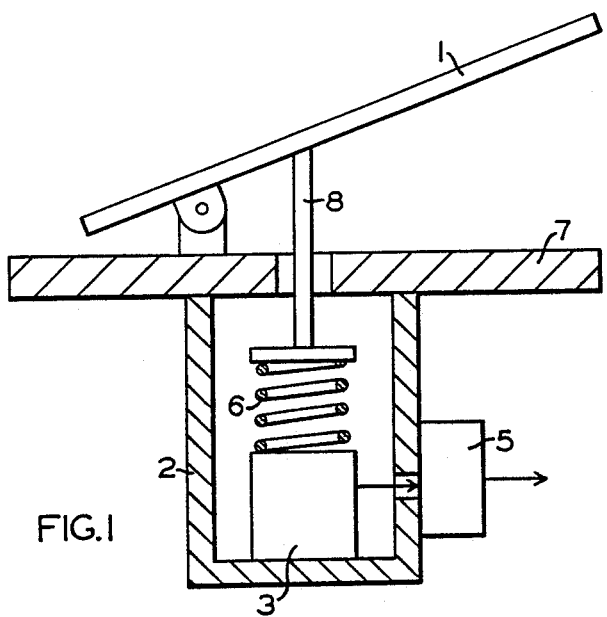
FIG. 1 is a schematic illustration of a braking power transmitter with a force sensor constructed according to the invention.

In accordance with a first embodiment of the invention illustrated in FIG. 1, the braking force transmitter consists of a pedal 1 which can be pivotally mounted in a known manner so that it can be depressed on a base plate 7.

The power exerted by the driver's foot is transmitted by a rod 8 to a steel spring 6. The characteristic of the spring is preferably designed to be linear. Alternatively, the steel spring 6 may be slightly progressive. The steel spring 6 is braced against a force sensor 3. The force sensor 3 is preferably a standard production component, whose characteristic is fixed and approximately linear. The steel spring 6 and force sensor 3 are located inside a housing 2. The electrical output signal of the force sensor 3 is fed to an electronic system 5, which, as illustrated, is fastened to the outside of the housing 2. The electronic system 5 is used to transform the approximately linear electrical output signal of the force sensor 3 into a progressive signal. The electronic system 5 can also be located inside the housing 2 or in another location. For example, it can contain a characteristic memory, which in a known manner assigns various input values to specified output values. The output signal of the electronic system 5 is then used after further processing to control a solenoid valve (modulator), not shown here. The modulator regulates the feed of pressure medium to the wheel brakes.

Figure 2:
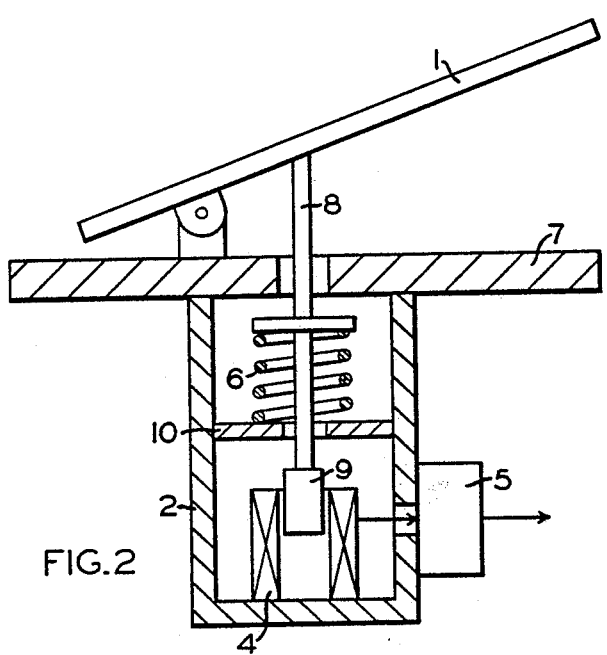
FIG. 2 is a schematic illustration of a braking power transmitter with a distance sensor.

FIG. 2 shows a second embodiment of the braking value transmitter, which contains a distance sensor 4 instead of a force sensor. Parts identical to those in FIG. 1 are designated by the same reference numbers. The steel spring 6 here is braced against a partition 10 of the housing. The movement of the pedal 1 is transmitted by means of a rod 8 to a core 9 of the distance sensor 4. The electrical output signal of the distance sensor 4, which here is designed as a coil with a movable core, is again fed to an electronic system 5.

Figure 3:
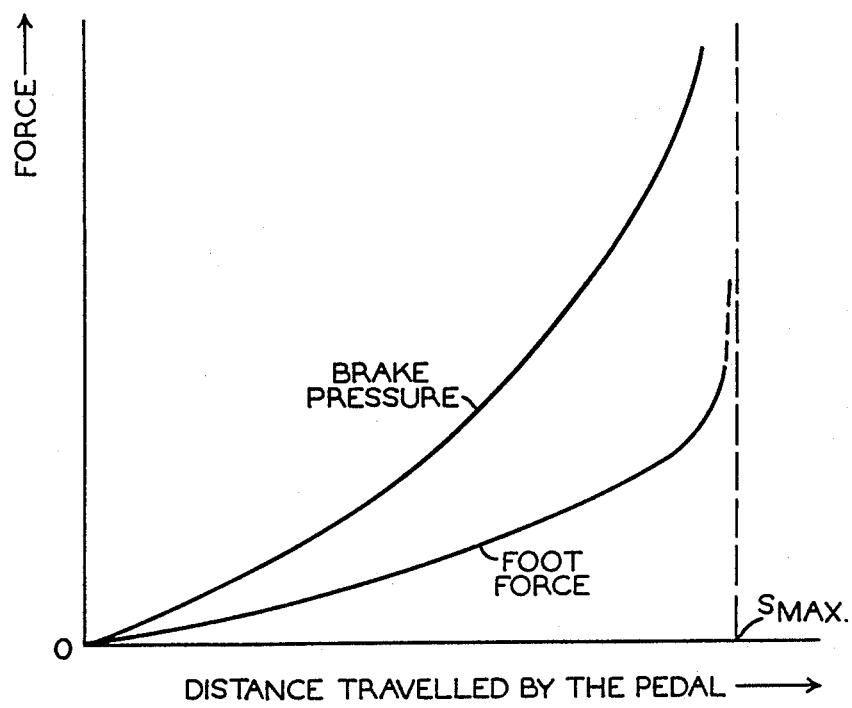
FIG. 3 is a diagram in which the pedal force and the braking pressure modulated downstream of a braking modulator is plotted over the distance traveled by the pedal.

The diagram in FIG. 3 shows the output signal of the braking power transmitter, as illustrated in FIGS. 1 and 2. The force to be applied by the driver's foot over the distance traveled by the pedal 1 or the angle of rotation of the pedal 1 increases in an approximately linear fashion. Friction forces and various angles of application of the foot force are not taken into consideration here. At the end of the pedal distance, at Smax, the pedal comes into contact with an end stop (not shown), e.g., a rubber pad. The force to be applied by the driver's foot in the final range thereby increases very sharply.

As a result of the electronic transformation of the sensor characteristics in the electronic system 5, on the other hand, the pneumatic braking pressure released into the brake cylinder increases progressively in the desired fashion. Thereby, over most of the range of the distance traveled by the pedal according to the invention, the increase of the force applied by the driver's foot is less progressive than the increase of the braking pressure. The diagram shows only the qualitative curve, i.e, the units of measurement of foot force and braking pressure are not identical.

The progressive output characteristic described above can also be achieved in a variant of the invention by selecting such sensors 3 or 4 as exhibit a corresponding non-linearity in themselves. This can be achieved most easily in the case of the distance sensor 4 by means of a graduated winding of its coil. A disadvantage, however, is that, in such a case, standard production sensors can generally no longer be used.

While a number of presently preferred embodiments of the present invention have been described in detail above, various other modifications and adaptations of the invention can be made by those persons skilled in the braking art without departing from the spirit and scope of the appended claims.

I claim:

1. A braking power transmitter which provides an output signal value to control a braking pressure in a motor vehicle, said braking power transmitter comprising:
   (a) a housing, said housing including a generally hollow interior portion;
   (b) a brake pedal pivotally connected to said housing to exert a pressure when depressed by an operator of such motor vehicle during a brake application, said brake pedal including a rod-like member which is secured to a bottom surface thereof and extends into said generally hollow interior portion of said housing;
   (c) a steel coil spring positioned in said housing with a first end abuttingly engaging said rod-like member, said rod-like member includes a plate member secured to one end thereof which has a face abuttingly engaging said first end of said steel coil spring, said steel coil spring being compressed when a force is applied to said brake pedal by such operator during such brake application;
   (d) an electronic force sensing means positioned in axial alignment with said steel coil spring within said generally hollow interior portion of said housing and in abutting engagement with a second end of said steel coil spring for measuring a force being exerted on said steel coil spring by said rod-like member secured to said brake pedal and for transmitting an output signal value having an approximately linear characteristic that is representative of said force measured by said electronic sensing means; and
   (e) an electronic system, connected to receive said approximately linear output signal value from said electronic force sensing means, said electronic system transforms said output signal value having said approximately linear characteristic into a progressivity or non-linear characteristic and transmits an output signal value in which said progressivity characteristic for a force applied to said brake pedal over a distance traveled by said brake pedal is less than that of a braking pressure over said distance traveled by said brake pedal.

2. A braking power transmitter, according to claim 1, wherein said steel coil spring is a coil spring designed to have one of a linear characteristic and a slightly progressive characteristic.

3. A braking power transmitter, according to claim 2, wherein said electronic system is positioned in one of inside said generally hollow interior portion of said housing and adjacent an outer wall of said housing.

4. A braking power transmitter, according to claim 3, wherein said steel coil spring has a linear characteristic.

5. A braking power transmitter, according to claim 4, wherein said electronic system is positioned adjacent an outer wall of said housing.

6. A braking power transmitter which provides an output signal value to control a braking pressure in a motor vehicle, said braking power transmitter comprising:
   (a) a housing, said housing including a generally hollow interior portion;
   (b) a brake pedal pivotally connected to said housing to exert a pressure when depressed by an operator of such motor vehicle during a brake application, said brake pedal including a rod-like member which is secured to a bottom surface thereof and extends into said generally hollow interior portion of said housing;
   (c) a steel coil spring positioned in said housing with a first end of the spring abuttingly engaging a plate member secured to said rod-like member, said steel coil spring being compressed when a force is applied to said brake pedal by such operator during such brake application; said spring having a second end abuttingly braced against a housing partition intermediate said housing,
   (d) an electronic distance sensing means positioned in axial alignment with said steel coil spring within said generally hollow interior portion of said housing, said distance sensing means including a movable core fast with the end of said rod-like member and including a fixed coil in which the core is movable for transmitting an output signal value having an approximately linear characteristic that is representative of the distance traveled by the brake pedal; and
   (e) an electronic system, connected to receive said approximately linear output signal value from said electronic sensing means, said electronic system transforms said output signal value having said approximately linear characteristics into a progressivity or non-linear characteristic and transmits an output signal value in which said progressivity characteristic for a force applied to said brake pedal over a distance traveled by said brake pedal is less than that of a braking pressure over said distance traveled by said brake pedal.

7. A braking power transmitter, according to claim 6, wherein said steel coil spring is a coil spring designed to have one of a linear characteristic and a slightly progressive characteristic.

8. A braking power transmitter, according to claim 7, wherein said electronic system is positioned in one of inside said generally hollow interior portion of said housing and adjacent an outer wall of said housing.

9. A braking power transmitter, according to claim 8, wherein said steel coil spring has a linear characteristic.

10. A braking power transmitter, according to claim 6, wherein said electronic system is positioned adjacent an outer wall of said housing.

* * * * *